US011451385B2

(12) United States Patent
Herder, III et al.

(10) Patent No.: US 11,451,385 B2
(45) Date of Patent: Sep. 20, 2022

(54) BIOMETRIC PUBLIC KEY SYSTEM PROVIDING REVOCABLE CREDENTIALS

(71) Applicant: Badge Inc., Lewes, DE (US)

(72) Inventors: Charles H. Herder, III, Dallas, TX (US); Tina P. Srivastava, Dallas, TX (US)

(73) Assignee: Badge Inc., Lewes, DE (US)

( * ) Notice: Subject to any disclaimer, the term of this patent is extended or adjusted under 35 U.S.C. 154(b) by 270 days.

(21) Appl. No.: 16/775,711

(22) Filed: Jan. 29, 2020

(65) Prior Publication Data

US 2020/0244451 A1 Jul. 30, 2020

Related U.S. Application Data

(60) Provisional application No. 62/798,608, filed on Jan. 30, 2019.

(51) Int. Cl.
*H04L 9/08* (2006.01)
*H04L 9/32* (2006.01)
*G06V 40/12* (2022.01)

(52) U.S. Cl.
CPC ........ *H04L 9/0866* (2013.01); *G06V 40/1335* (2022.01); *G06V 40/1347* (2022.01);
(Continued)

(58) Field of Classification Search
CPC ... H04L 9/0866; H04L 9/0825; H04L 9/0894; H04L 9/3228; H04L 9/3231;
(Continued)

(56) References Cited

U.S. PATENT DOCUMENTS 7,272,245 B1 9/2007 Layton
2001/0031075 A1 10/2001 Fujii
(Continued)

FOREIGN PATENT DOCUMENTS

EP  1 175 749 B1  7/2005
JP  2006-166433 A  6/2006
(Continued)

OTHER PUBLICATIONS

Herder et al., "Trapdoor Computational Fuzzy Extractors and Stateless Cryptographically-Secure Physical Unclonable Functions," IEEE Transactions on Dependable and Secure Computing, vol. PP, No. 99, 18 pages (Mar. 1, 2016).
(Continued)

*Primary Examiner* — J. Brant Murphy
(74) *Attorney, Agent, or Firm* — Sunstein LLP

(57) ABSTRACT

A device generates a biometric public key for an individual based on both the individual's biometric data and a secret S, in a manner that verifiably characterizes both while tending to prevent recovery of either. The biometric data has a Sparse Representation and is encoded in a manner to include a component of noise, such that it is challenging to identify which locations are actually encoded features. Accordingly, the biometric data are encoded as a vector by choosing marker at locations where features are present and, where features are not present, choosing noisy data. The noisy data may be chaff bit values selected collectively from a group of (a) random values and (b) independent and identically distributed values. The biometric public key may be later used to authenticate a subject purporting to be the individual, using a computing facility that need not rely on a hardware root of trust.

22 Claims, 6 Drawing Sheets

(52) U.S. Cl.
CPC ........ *G06V 40/1365* (2022.01); *H04L 9/0825* (2013.01); *H04L 9/0894* (2013.01); *H04L 9/3228* (2013.01); *H04L 9/3231* (2013.01)

(58) Field of Classification Search
CPC . H04L 9/0891; H04L 9/3239; H04L 63/0428; H04L 63/0861; G06K 9/00026; G06K 9/00067; G06K 9/00087
See application file for complete search history.

(56) References Cited

U.S. PATENT DOCUMENTS

| | | |
|---|---|---|
| 2006/0123239 A1 | 6/2006 | Martinian et al. |
| 2007/0118758 A1 | 5/2007 | Takahashi et al. |
| 2007/0140145 A1 | 6/2007 | Kumar et al. |
| 2008/0025575 A1 | 1/2008 | Schonberg et al. |
| 2008/0072068 A1 | 3/2008 | Wang et al. |
| 2008/0235515 A1 | 9/2008 | Yedidia et al. |
| 2009/0271634 A1 | 10/2009 | Boult et al. |
| 2011/0022835 A1* | 1/2011 | Schibuk ............... G06Q 20/382 713/153 |
| 2011/0126024 A1 | 5/2011 | Beatson et al. |
| 2011/0302420 A1 | 12/2011 | Davida |
| 2012/0087550 A1 | 4/2012 | Akkermans et al. |
| 2012/0195475 A1 | 8/2012 | Abiko |
| 2014/0105403 A1 | 4/2014 | Baldi et al. |
| 2014/0139318 A1 | 5/2014 | Malpani et al. |
| 2014/0372766 A1 | 12/2014 | Ryan, Jr. |
| 2016/0034585 A1 | 2/2016 | Rokhlenko et al. |
| 2016/0125416 A1 | 5/2016 | Spencer et al. |
| 2017/0085562 A1* | 3/2017 | Schultz ............... H04L 63/0861 |
| 2017/0141920 A1* | 5/2017 | Herder, III ............ H04L 9/3231 |
| 2017/0337364 A1 | 11/2017 | Whaley et al. |
| 2018/0114226 A1 | 4/2018 | Desai et al. |

FOREIGN PATENT DOCUMENTS

| | | |
|---|---|---|
| JP | 2007-148470 A | 6/2007 |
| JP | 2008-502071 A | 1/2008 |
| KR | 10-2018-0000849 A | 1/2018 |
| KR | 101845192 B1 | 4/2018 |
| WO | WO 2005/069534 | 7/2005 |
| WO | 2005/122467 A1 | 12/2005 |
| WO | WO 2017/075063 A1 | 5/2017 |

OTHER PUBLICATIONS

Herder et al., "A Stateless Cryptographically-Secure Physical Unclonable Function," IEEE Transactions on Dependable and Secure Computing, 17 pages, (2015).

Rivest et al., "A Method for Obtaining Digital Signatures and Public-Key Cryptosystems," Communications of the ACM, vol. 21, No. 2, pp. 120-126, (Feb. 1978).

Herder et al., "Trapdoor Computational Fuzzy Extractors," International Association for Cryptologic Research, vol. 20141118:190315, Nov. 15, 2014, 14 pages.

Fuller et al., "Computational Fuzzy Extractors," International Conference on Computer Analysis of Images and Patterns, Springer, Berlin, Heidelberg, Dec. 1, 2013, pp. 174-193.

Nandakumar et al., "Fingerprint-Based Fuzzy Vault: Implementation and Performance," IEEE Transactions on Information Forensics and Security, vol. 2, No. 4, Dec. 2007, pp. 744-757.

International Searching Authority, International Search Report—International Application No. PCT/US2016/061647, dated Feb. 21, 2017, together with the Written Opinion of the International Searching Authority, 14 pages.

U.S. Patent and Trademark Office/Lin Chang, Non-Final Rejection, U.S. Appl. No. 15/349,781, dated Jul. 23, 2018, 25 pages.

U.S. Patent and Trademark Office/Lin Chang, Final Rejection, U.S. Appl. No. 15/349,781, dated Feb. 14, 2019, 29 pages.

U.S. Patent and Trademark Office/Lin Chang, Non-Final Rejection, U.S. Appl. No. 15/349,7481, dated Jun. 12, 2019, 25 pages.

European Patent Office, Extended European Search Report, Application No. 16865141.2, dated Jun. 21, 2019, 5 pages.

International Searching Authority/KR, International Search Report and Written Opinion of the International Searching Authority, Application No. PCT/US2019/032996, dated Sep. 24, 2019, 13 pages.

Dodis et al., *Fuzzy Extractors: How to Generate Strong keys from Biometrics and Other Noisy Data*, Apr. 17, 2004, Advances in Cryptology—Eurocrypt 2004, LNCS, Springer, pp. 523-540, 978-3-540-21935-4, XP019005038.

European Patent Office, Communication pursuant to Article 94(3) EPC, Application No. 16865141.2, dated Feb. 7, 2020, 6 pages.

European Patent Office, International Search Report and Written Opinion of the International Searching Authority, Application No. PCT/US2020/015607, dated Apr. 17, 2020, 15 pages.

* cited by examiner

US 11,451,385 B2

BIOMETRIC PUBLIC KEY SYSTEM PROVIDING REVOCABLE CREDENTIALS

PRIORITY

This patent application claims the benefit of U.S. provisional patent application Ser. No. 62/798,608, filed Jan. 30, 2019, which is hereby incorporated, in its entirety, by reference.

CROSS-REFERENCE TO RELATED APPLICATIONS

This application is related to U.S. patent application Ser. No. 15/349,781 (corresponding to U.S. Patent Application Publication No. US 2017/0141920) and PCT Patent Application No. PCT/US2016/061647 (corresponding to International Publication No. WO 2017/083732, both filed Nov. 11, 2016 and claiming the benefit of U.S. Provisional Application No. 62/255,186, filed Nov. 13, 2015. Each of these related applications is hereby incorporated herein by reference in its entirety. We refer to International Publication No. WO 2017/083732 as "Our PCT Publication."

TECHNICAL FIELD

The present invention relates to security arrangements for protecting computers, components thereof, programs or data against unauthorized activity by providing authentication of user biometric data, and more particularly to using cryptographic means for verifying the identity or authority of the user using biometric data of the user without the need for non-transient storage of the biometric data.

SUMMARY OF THE EMBODIMENTS

In accordance with one embodiment of the invention, there is provided a device for generating a biometric public key for an individual based on biometric data of the individual, without the need for non-transient storage of the biometric data. In this embodiment, the device includes a transducer and a computing facility, coupled to the transducer. The computing facility includes a computing processor and a non-transitory computer readable storage medium encoded with instructions that, when executed by the computing processor, establish processes including receiving by the computing facility, from the transducer, a digital electronic signal that characterizes a biometric of the individual; extracting by the computing facility, from the digital electronic signal, a set of biometric values of the individual; identifying, in the set of biometric values, locations where features are present; encoding the set of biometric values by choosing a marker at locations where features are present and, where features are not present, choosing noisy data; computing by the computing facility the biometric public key based on the secret number and the encoded set of biometric values, wherein the biometric public key verifiably characterizes both the biometric data of the individual and the secret number without the need for non-transient storage of either the biometric data of the individual or the secret number; and storing the biometric public key in a storage facility.

Optionally, the set of biometric values of the individual has a Sparse Representation. Optionally, the encoded set of biometric values is a column vector E having N bits. Optionally, the secret number S is a secret column vector of N bits. Alternatively or additionally, generating the secret number S includes computing and storing a hash F(S) of the secret number S in the storage facility. Optionally, the biometric public key B is computed using a matrix A having M rows and N columns of bits, and matrix A is stored in the storage facility. Alternatively or additionally, the biometric public key B is computed by multiplying the secret number S and the matrix A, and adding a column vector E of the encoded set of biometric values. Optionally, the marker is a constant value. Optionally, the marker is "0." Optionally, the noisy data is a set of chaff bit values selected collectively from a group of (a) random values and (b) independent and identically distributed values.

In another embodiment, there is provided a device for using biometric data to authenticate a subject as an individual whose biometric data has been previously obtained using a first transducer, without the need for non-transient storage of the biometric data. In this embodiment, the device includes a second transducer and a computing facility. The computing facility that is coupled to the second transducer, the computing facility including a computing processor and a non-transitory computer readable storage medium encoded with instructions that, when executed by the computing processor, establish computer processes including receiving by the computing facility, from the second transducer, a digital electronic signal that characterizes a biometric of the subject; extracting by the computing facility, from the digital electronic signal, (a) a set of biometric values of the subject and (b), for each member of the set of biometric values of the subject, a confidence value indicating a degree of confidence that the corresponding biometric value is stable between characterizations; encoding the set of biometric values of the subject; using the confidence values to select, by the computing facility, a confident subset of the encoded set of biometric values of the subject, the confident subset being a reliable discriminant of the identity of the subject based on the biometric; receiving, by the computing facility, from a storage facility, (i) a hash F(S) of a secret number S and (ii) a biometric public key B that was computed based on the secret number S and the biometric data of the individual that has been previously obtained using the first transducer, wherein the biometric data of the individual had been encoded to have a marker at locations where features are present and, where features are not present, to have noisy data; computing, by the computing facility, a candidate value S' for the secret number S using the biometric public key and the confident subset; and performing an authentication process by determining whether the candidate value S' is deemed equivalent to the secret number S.

Optionally, the biometric data of the individual has a Sparse Representation. Optionally, the encoded set of biometric values of the subject is a column vector E' having M bits. Optionally, the encoded biometric data of the individual is a column vector E having N bits. Optionally, (a) the secret number S is a first secret column vector of N bits and (b) the candidate value for the secret number S' is a second column vector of N bits. Alternatively or additionally, the computer processes further include receiving, by the computing facility, from the storage facility, a matrix A having M rows and N columns of bits, wherein the biometric public key B was computed based on the matrix A.

Optionally, the candidate value for the secret number S' is computed by (a) multiplying the inverse of the matrix A with (b) the difference between the biometric public key and a column vector E' of the encoded set of biometric values of the subject. Alternatively or additionally, the computer processes further include computing a hash F(S') of the candidate value for the secret number S'; and performing the authentication process by determining whether (a) the hash F(S') of the candidate value for the secret number S' is deemed equivalent to (b) the hash F(S) of the secret number S. Optionally, the set of biometric values of the subject is encoded to have the marker at locations where features are present and, where features are not present, to have noisy data, and the confident subset is selected from biometric values in the set of biometric values of the subject that are not noisy data. Optionally, the marker is a constant value. Optionally, the marker is "0." Optionally, the noisy data is a set of chaff bit values selected collectively from a group of (a) random values and (b) independent and identically distributed values.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
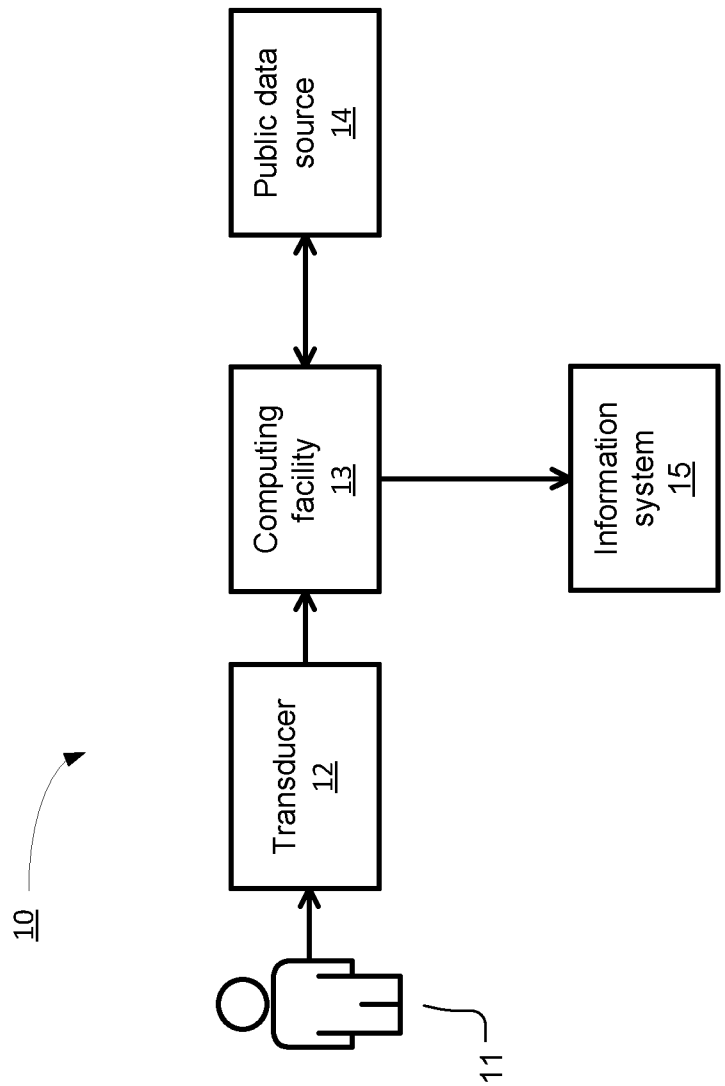
FIG. 1 is a schematic representation of an environment 10 in which an embodiment of the invention may be used.

Definitions.

As used in this description and the accompanying claims, the following terms shall have the meanings indicated, unless the context otherwise requires:

A "set" includes at least one member. An "individual" is an animate or inanimate object having a unique identity, and may be a human or other organism.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "subject" is an animate or inanimate object purporting to have the unique identity of a specific individual.

A "biometric" is a measurable characteristic of a distinct individual or of a distinct group of individuals, or a combination of such characteristics, that may be used to determine the unique identity of the individual or group. Some non-limiting examples of such measurable organic characteristics are: an iris pattern, a retinal blood vessel pattern, a fingerprint, a genetic pattern or DNA fingerprint, a voice print, a speed or cadence of typing, a pattern of blood flow, a brain structure or electrical pattern, a behavioral signal (such as hand movements), expertise-based continuous biometrics, and a gait of the individual. An example of a measurable inorganic characteristic, when the individual is a distinct silicon wafer having transistors, is a random variation in the transistor gate delays caused by the process of manufacturing the distinct silicon wafer; such as "silicon biometric" is detectable using a ring oscillator, as is known in the art.

A "biometric value" is a categorization of a portion of a measurement of a biometric according to a property of the measurement. For example, if the biometric is an iris print, and measurement consists of imaging an iris as an array of pixels, then the relevant portion of the measurement is a single pixel in the image, and the relevant property may be a brightness or color of the pixel to be categorized. Measurement of the entire biometric may include many biometric values.

A "confidence value for a biometric value", or simply "confidence value", is a number indicating a degree of relative confidence that the corresponding biometric value was correctly categorized.

A "confident subset" of biometric data is a collection of biometric values, selected according to their respective confidence values, that is (a) large enough to uniquely identify an individual within a given universe of identifiable individuals, and (b) small enough to be repeatably obtainable across measurements of the corresponding biometric under different conditions.

A "transducer" is any device having, as an output, an electronic signal that encodes a characterization of a biometric as a set of measured biometric values. If the output of such a device is not directly digital, then the term "transducer" includes any device additionally used to transform the output into digital form.

A "computing facility" means an electronic system having components that include a computing processor and a memory storing instructions that can be executed by the computing processor. A computing facility may be found, for example, in a desktop computer, a smartphone, a tablet computer, and similar electronic devices. A computing facility also may be found in embedded computing systems that perform specialized computations, for example point-of-sale machines, automated teller machines (ATMs), physical access barriers, video display kiosks, and similar electronic devices.

A "public key characterizing a biometric" (sometimes hereinafter a "biometric public key") is a number that (a) is calculated, based on a secret number and a set of biometric values of an individual, in a manner tending to prevent recovery of either the secret number or the set of biometric values by a subject other than the individual, and (b)

verifiably characterizes both the biometric data of the individual and the secret number, without the need for non-transient storage of either the biometric data of the individual or the secret number. A biometric public key has nothing to do per se with public key/private key systems known in the art (of which some systems are sometimes called "PKI", for "public key infrastructure"), such as the RSA system. (See Rivest, Ronald L., Adi Shamir, and Len Adleman. "A method for obtaining digital signatures and public-key cryptosystems". Communications of the ACM 21.2 (1978): 120-126.)

A "storage facility" is a local or remote system for non-transitory storage of digital data. A storage facility optionally includes a server system to serve the data responsive to a request message from a processor, or the system can be accessed directly by the processor.

A "Dense Biometric Representation" is a digital characterization of data associated with a biometric in which each bit corresponds to a value of a feature at a given location within the biometric data. Typically, such a representation consists of a quantized (or thresholded) analog value that is determined locally within the biometric data. Ideally, such data should have (a) low correlation between bits and (b) approximately 50% bias.

A "Sparse Biometric Representation" is a digital characterization of data associated with a biometric wherein each bit corresponds to the presence or absence of a feature at a given location within the biometric data. Typically, such a representation (a) has a small number of features and a large vector space, and (b) makes it difficult to guess which vector locations are associated with features.

A "vector" is a matrix having only a single column or, alternatively, a single row.

A "marker" is an entry in a vector corresponding to a meaningful data item, i.e., a data item that is not noisy data as defined herein. A marker may, for example, be a constant value, such as "0."

"Noisy data" is data having sufficiently high entropy as to preclude its being ordinarily decoded into a signal. An example of noisy data is a set of chaff bit values selected collectively from a group of (a) random values and (b) independent and identically distributed values.

Embodiments of the present invention provide improvements in the technology described in Our PCT Publication, and can be used in a wide range of environments, including the environments discussed in International Publication No. WO 2017/083732 ("Our PCT Application"). To illustrate some of these environments, we have appropriated FIGS. 1-4 from Our PCT Application, and described them anew in the context of the present invention.

Figure 3:
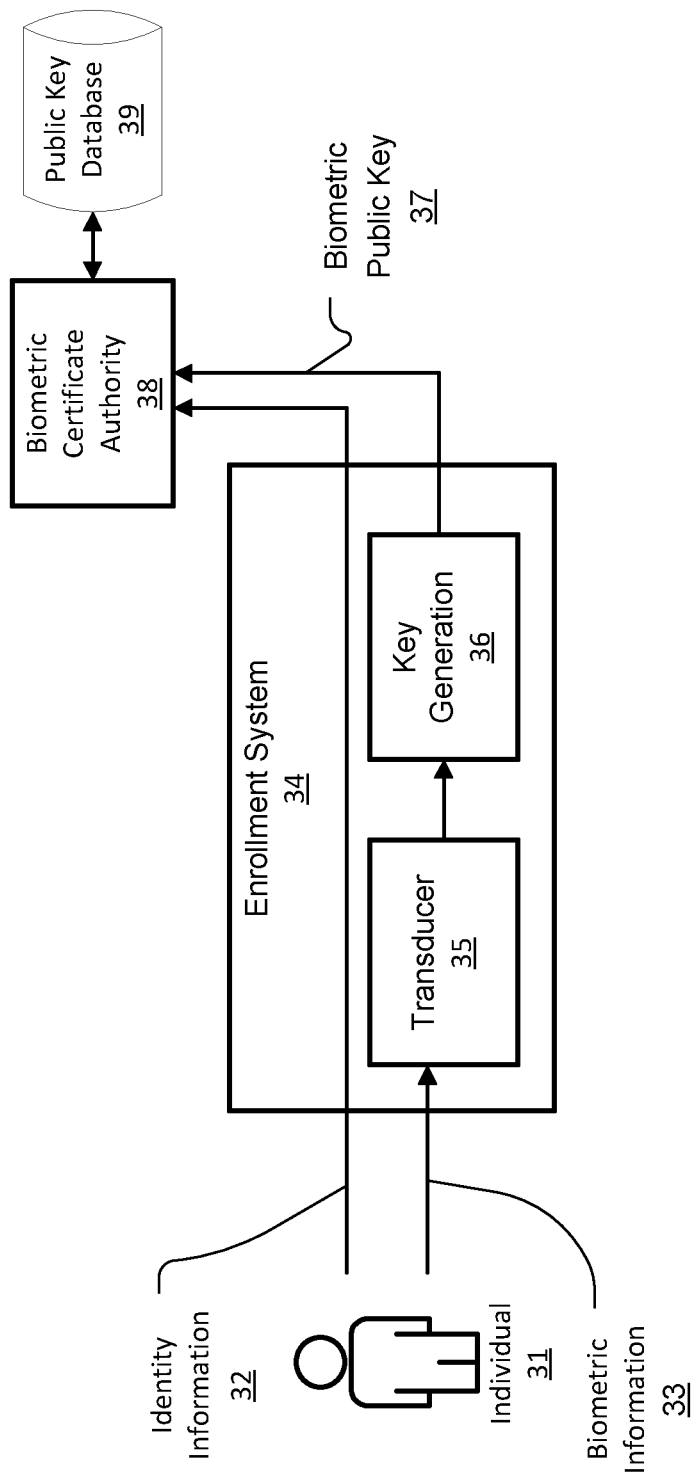
FIG. 3 is a schematic representation of data flow through functional components used in an embodiment of the invention during an enrollment process.

Preliminarily, we discuss two new embodiments of the present invention, each of which can be used for public biometric key generation and for authentication using a public biometric key. We discuss these two embodiments in relation to an embodiment, disclosed in Our PCT Application, which we call our "Original Process." The computer processes constituting an embodiment of the Original Process are summarized in the first labeled column of Table 1 below (for public biometric key generation) and in the first labeled column of Table 2 below (for authentication using a public biometric key). Each step in each process is numbered in the leftmost column, and these numbered steps are referenced in this description. As shown in Table 1, in our Original Process, all the process steps are performed by what we call the "Enroller," a system that may be configured as shown in FIG. 3 and described below. In our Original Process, an initial step in generating the public key, in step (1), involves obtaining a transiently stored biometric (such as an iris image) of the subject, in what we call a "Dense Representation," using a confident subset of the biometric data. In step (2), these biometric data are encoded as E, a column vector of M bits. In step (3), there is generated a secret column vector S having N bits, following which is computed a hash F(S). In step (4), there is chosen matrix A having M rows and N columns of bits, and in step (5) there is calculated public biometric key B=A·S+E. In step (6), the public biometric key B is published and is used by the Authenticator as discussed in Table 2. The matrix A is also made available to and is used by the Authenticator as discussed in Table 2. The hash of S, namely F(S), is also used in authentication, but can be transmitted to a Server for use in authentication as discussed below. The biometric data are not stored except transiently, and are no longer needed once the public biometric key has been generated.

For authentication using our Original Process, the process steps, shown in Table 2, are performed largely by what we call the "Authenticator," a system that may be configured as shown in FIG. 1 and described below. In our Original Process, an initial step in authentication, in step (1) involves obtaining a transiently stored biometric (such as an iris image) of the subject. In step (2), the Authenticator receives the public biometric key B, along with the hash of the secret S, namely F(S), and the selected matrix A, items which are also public. In step (3), the Authenticator encodes the biometric data directly as E', a column vector of M bits, and selects N confident rows of E'. In step (4), the Authenticator uses the confident rows and E' to compute S'=$A^{-1}$·(B−E'). At this point it should be noted that if confident rows of E' correspond to the confident rows of E, then S will be equal to S'. In step (5), the Authenticator computes the hash of S', namely F(S'), and sends this hash value to the Server, which has stored at least the hash of S, namely F(S), from step (6) of Table 1.

As discussed in our PCT Publication, a benefit of this technology is that in generating the public biometric key and in using the public biometric key for authentication, the biometric data need not be stored other than transiently. Moreover, the secret S is not shared; instead only the hash of S, namely F(S) is used for authentication. Nevertheless, if the biometric data, for example, the vector E, would be stolen by some means, then the secret S could be calculated, rendering insecure any authentication using the public biometric key. Alternatively, if the secret S would be stolen, then the vector E could be calculated, also rendering insecure any authentication using the public biometric key.

To address these risks, in both new embodiments, the process is what we call "reusable," because, if a given public biometric key has been compromised, a new public biometric key can be calculated and the previous public biometric key can be retired. In a first one of the new embodiments, the hash of the secret S, namely F(S), is not needed or used for authentication. In this approach, illustrated in the second labeled column of Table 1 and Table, 2, the steps in generating the public biometric key are almost the same as in our Original Process up through step 5, in which is calculated the public biometric key B=A·S+E. (As in our Original Process, we use a Dense Representation for the biometric.) However, in step (3), instead of calculating the hash of S, namely F(S), there is generated a random number r. Moreover, in step (6), unlike our Original Process, there is computed by the Enroller a new function that we call the "encryption of r under the key S," represented as Enc_S(r). The function Enc_S(r) can alternatively be calculated as HMAC(r, S), where HMAC is a hash-based message authentication code, of the type described in Internet Engineering Task Force Request for Comments memorandum RFC 2104, available at https://tools.ietforg/html/rfc2104 on Jan. 20, 2019. In step (6), the quantities A, B, r, and Enc_S(r) are shared with the Server. (It can be seen that the entities r and Enc_S(r) are used instead of F(S) as in our Original Process.) In step (7), when the Server receives A, B, r, and Enc_S(r), it generates a second random secret column vector S' having N bits and computes B'=B+A·S'. However, because B=A·S+E, removing B from this equation, we have B'=A·(S+S')+E, and this relationship is used in authentication.

In this embodiment, authentication begins with step (1), as in the case of our Original Process, in which there is obtained the transiently stored biometric. In step (2), the Authenticator receives from the Server A, B, r, and Enc_S (r). In step (3), as in step (3) of our Original Process, the Authenticator encodes the biometric data directly as E', a column vector of M bits, and selects N confident rows of E'. In step (4), in a manner analogous to step (4) of our Original Process, the Authenticator uses the confident rows and E' to compute S"=A$^{-1}$·(B−E'). At step (5), however, this embodiment diverges from our Original Process, because the Server and the Authenticator must, in this step (5), work securely together to achieve authentication. At this step, the Authenticator has S" from step (5), and, from step (7) in generation of the public biometric key, the Server has r and Enc_S(r) and has generated S'. In a multi-party computation, the Server works with the Authenticator to compute r'=Dec_X (Enc$_s$(r)), where X=S"−S' and Dec_X(y) is the decryption of y under the key X The computation can be performed using currently known two-party computation (2PC) or multiparty computation (MPC) protocols, such as Yao's Garbled Circuits. See, for example, Sophia Yakoubov, "A Gentle Introduction to Yao's Garbled Circuits," available at http://web.mit.edu/sonka89/www/papers/2017ygc.pdf on Jan. 21, 2019. In step (6), the Server authenticates by determining whether r'=r.

The effect of this embodiment is that the secret S is not exposed to the public nor even transferred from the Enroller. In other words, neither the Authenticator nor the Server knows the secret S, and the Server cannot break the public biometric key B. Furthermore, authentication is impossible without cooperation between the Server and the Authenticator. Moreover, the Server does not store the biometric data. In this way, even if the biometric data are fully compromised, the secret S remains secret, and the public biometric key may be revoked without having to revoke or re-provision S.

It is apparent that until step (6) in the public biometric key generation, our reusable process in the first embodiment is essentially the same as our Original Process, and, in step (6), the processes diverge, because our reusable process in the first embodiment dispenses with the need for using the hash of S. Instead, this reusable process uses the additional random number r and, during generation of the public biometric key, computes the function Enc_S(r). That function is used in a multi-party authentication process involving both the Authenticator and the Server.

An implementation of the first embodiment may be represented in accordance with the following protocol:

PROTOCOL Description:
NOTE: "+" is bitwise XOR, "." is dot product, "|" is concatenation
Enc_k(y), Dec_k(y) is encryption, decryption of y under key k Enrollment:
Client enrolls his/her secretes S,e as (A,B ) with (B = A.S + e)
Client chooses random r, gives server r, Enc_S(r)
Authentication:
Server has (A,B)
Server generates random S'
Server computes (A,B') = (A,B + A.S')
Server sends authenticator (A,B')
Authenticator collects biometrics, extracts S" = S' + S
(ASIDE: Now, Authenticator has S", Server has S', r, Enc_S(r))
Client and Server run Secure MPC to compute
Dec_(S'+S")(Enc_S(r)) == r
Authentication succeeds if SMC returns TRUE
VARIANTS: (not mutually exclusive of above or each other)
− Bootstrap recovery key
  Client generates recovery key rk and enrollment and sends Enc_S(rk) to server
  Multiparty computation of rk = Dec_(S' + S")(Enc_S(rk))
  (either/both client and server get recovery key depending on architecture)
− Bootstrap session key
  Authenticator and Server exchange NONCEs (Nonce_Auth, and Nonce_Serv)
  Multiparty computation of Sk = HMAC(Nonce_Auth | Nonce_Serv, S' + S")
  (both get session key)
− Public Key Tamper-prevention
  Client generates HMAC(A | B, S) at enrollment and sends to server
  Multiparty computation of HMAC(A | B, S' + S") to verify correctness
  (both get HMAC)

In a second embodiment of the present invention, there is achieved a reusable fuzzy extractor process using Noise, C, with a confident subset. This embodiment is illustrated in the third labeled column of Tables 1 and 2.

Traditional fuzzy extractors can only generate one biometric public key per set of biometric data. For example, a human cannot enroll twice with a same finger. With the reusable fuzzy extractor of the second embodiment, an enroll function performed by the Enroller may be called more than once on the same biometric data (or some subset thereof) without violating the security requirements of the system.

The reusable fuzzy extractor uses noisy data, such as random chaff, in addition to valid biometric data as a part of computing the biometric public key. Recall that the Original Process interprets the biometric enrollment data as a bit vector E, and subsequent authentication data as E'. The extractor succeeds if the authenticator can identify a "confidence subset" of E' whose Hamming Distance to E is small (below a threshold). The reusable fuzzy extractor of the present invention adds noisy data to E, but it is still able to identify the same confidence subset. The addition of the noisy data allows multiple public keys to be generated from the same biometric data. The reusable fuzzy extractor allows creation of multiple public keys from the same, similar, or overlapping biometric data in such a way that it maintains security and allows revocability.

As in the case of our Original Process, all the steps of generating the public biometric key using the reusable fuzzy extractor are performed by the Enroller. However, unlike our Original Process and unlike the first embodiment of the present invention described above, in this second embodiment, in step (1), we begin with obtaining a transiently stored biometric with a Sparse Representation. In step (2) of this embodiment, the biometric data are encoded as vector E, such as by choosing "0" at locations where features are detected and, where features are not detected, choosing noisy data, such as a uniformly random bit (or bits that are independent and identically distributed, potentially with a certain bias). E is a column vector of M bits. An entry of a "0" in the vector E indicates that the data item is meaningful, in that it is not noisy data. In fact, the entry can, for example, be any selected constant. More generally, the entry can be any suitable marker that indicates the presence of a meaningful data item, namely an entry that is not noisy data.

The reusable fuzzy extractor takes a different approach to encoding E (and E') from the biometric data—instead of interpreting the biometric data as a binary string. In one embodiment of step (2), the reusable fuzzy extractor interprets the biometric data as a set of vectors in some high-dimensional vector spaces. In this embodiment, the reusable fuzzy extractor quantizes such space, and assigns a bit to each quantized point as follows. If there exists within the set of vectors comprising the user's biometric data a vector that quantizes to a given point (e.g., location where a feature is detected), then the bit associated with that point is assigned to "0". Otherwise, the bit associated with the point is assigned to a noisy data bit, of which an example is a uniformly random bit (referred to as a "chaff" or "random chaff"), and the point associated with the noisy data bit may be referred to as a "noisy data point." This assignment is performed for all quantized points in the vector space, resulting in a constant-sized bit-vector. This bit vector is then used as the E vector in the Original Process.

In embodiments, the noisy data need not be random. It just has to be data that can be distinguishable from the confident subset. Data that is de-correlated from the biometric data is an example that can be used for the noisy data. Pseudorandom data is another example that can be used for the noisy data. The noisy data can be added anywhere in the system and in multiple places—it just cannot replace the confident subset.

The remaining steps of public key generation parallel those our Original Process: (3) generate secret column vector S having N bits and compute hash F(S); (4) choose matrix A having M rows and N columns of bits; (5) calculate public biometric key B=A·S+E; and (6) publish or send F(S), A, B.

In the second embodiment, authentication is achieved in the same manner as in our Original Process: (1) obtain the transiently stored biometric; (2) receive F(S), A, B; (3) encode the biometric data directly as E', a column vector of M bits, and select N confident rows of E'; (4) use the confident rows and E' to compute $S'=A^{-1}\cdot(B-E)$; (5) compute hash F(S'), and send it to the Server, where in step (6) the Server authenticates by determining if the hashes are equal, F(S')=F(S). It should be noted that the noisy data points are not part of the confident subset, because the noisy data points are de-correlated from the biometric data. Conversely, a reliably computed vector corresponds to a bit in the confident subset. It is the addition of these noisy data points that further increases the security of the construction, allowing for the fuzzy extractor to be reusable.

The major differences between the second embodiment of the present invention and our Original Process are in steps (1) and (2) of the second embodiment for generating the public key biometric. In step (1) we begin with a Sparse Representation of the biometric, and in step (2) this Sparse Representation is encoded in a manner making it challenging to identify which locations of the vector are actually encoding features. There are so much data in E that, even if E were stolen, the data would not be particularly revealing of the biometric itself, because E contains so much noise C. Moreover, in the event that the biometric public key would be compromised, a new public key could be generated by the same method as in steps (1) and (2) but using a different component of noise C.

Because the first and second embodiments of the present invention diverge from our Original Process at different stages of the Original Process, the first and second embodiments can also be practiced together. Consequently, in a further embodiment of the present invention, the Enroller begins by obtaining the transiently stored biometric with Sparse Representation as in step (1) of the third labeled column of Table 1, and then encodes the biometric data in a manner to include Noise, C, as in step (2) of the third labeled column of Table 1. Thereafter, the processing follows the steps shown in the second labeled column of Table 1 and Table 2. In this fashion, instead of computing the hash of S, the processing includes in step (3), generating random number r and random secret column vector S having N bits as shown in the second labeled column. In step (6), the Enroller sends to the Server A, B, r, and Enc_S(r), In step (6), the Server receives and registers A, B, r, Enc_S (r) and generates random secret column vector S' having N bits and computes B'=B+A·S'. The authentication processing is precisely as previously described in connection with the second labeled column of Table 2. With this further embodiment, the presence of the Noise C makes it difficult to discern the biometric even before generation of the biometric public key, and in the event that the biometric public key would be compromised, a new biometric public key could be generated using a different component of noise C. Moreover, independent of the noise C, the use of the random number r provides another basis for generation of a new biometric public key, and the multi-party authentication procedure previously described offers further security.

The second embodiment with the reusable fuzzy extractor can be used in various example applications, as follows.

The simplest application of the reusable fuzzy extractor embodiment is in the enablement of public key revocation. In this use case, after the user enrolls his/her biometric data with a biometric key provider who generates the user's public key, one of the following happens: (1) the biometric key provider is hacked—resulting in break in the chain of trust that binds the user's identity to the user's public key, or (2) the user's biometric data changes (e.g., loss/damage of a finger). In either of these cases, it is necessary for the user to re-enroll the user's biometric data (in the first case, because the biometric key provider fails, and in the second, because the user's biometrics change). This is impossible with current fuzzy extractor technology (because having a 2nd public key derived from the same biometric data is not secure), but is trivially possible with the reusable fuzzy extractor of the present invention. The user needs only to re-enroll the user's biometric data with a trusted biometric key provider. With the reusable extractor, a user can "revoke" the user's public key, and enroll a new public key at any time.

Another interesting application of the reusable fuzzy extractor embodiment comes in the form of enrolling multiple groups of people's biometric data under one public key. In this construction, each user's biometric features constitute a portion of the biometric data registered within the public key, and the natural threshold cryptography used during key extraction will only succeed if a quorum of people is present during the key extraction process. However, this construction breaks down with traditional fuzzy extractor systems, as there are several requirements of group keys that are incompatible with the one-key-per-user model. For example: (1) the same user might be present in more than one group, or (2) the users in the group might change over time, requiring revocation of individual user's rights to access the group. Both of these cases require the construction of at least 2 public keys, where part of each key is derived from a single user's biometric data. Having a second public key derived from the same biometric data breaks security. However, with our reusable extractor, this is trivially possible, as users (or groups of users) may enroll at any time and revoke previous keys at will.

Another application of the reusable fuzzy extractor is enrolling the same person multiple times for a privacy enhancement. One concern with only allowing one enrollment per person is that the person's biometric public key is uniquely bound to them for their entire life. This is not desirable from a privacy perspective, as once an adversary identifies the relationship between public key and user, this public key may be used to track the user for the rest of his/her life. This violates many of the core principles of privacy. With a reusable fuzzy extractor however, this problem goes away. A user may enroll the user's biometric data as many times as desired, and revoke public keys that the user owns at will. As a result, there is no requirement for a unique public key to be bound to a user for their entire life.

A further application of the reusable fuzzy extractor embodiment of the present invention is evolving the user's public key for improved performance. Biometric data is relatively constant, however there are reasons why it can change over time (for example, damage to the biological structure, or naturally occurring processes, such as fingerprint ridge flattening). As a result, it is helpful to be able to update the biometric template after a successful authentication with updated information learned about the biometric during the authentication process. In the reusable fuzzy extractor, once a user successfully extracts his/her key, the user may then run a local algorithm to compare the enrolled biometric template (which may be obtained by using the extracted key) with the measured biometric data. If the algorithm determines that an update to the template is necessary, it can automatically generate a new public key, update the public key database, and revoke the previous key (observe that since the key is extracted, the database can establish a trusted communication path with which to update the biometric public key).

Another application of the reusable fuzzy extractor embodiment is enrolling multiple alignment and feature extraction strategies. Biometric feature recognition is a complex process that can be dependent on the hardware sensor, the software strategies used to extract the feature data, as well as the representation of this feature data. Many modern biometric systems that must operate across domains have different templates depending on the sensor being used. Moreover, feature extraction strategies differ depending on the style of authentication (e.g., whether the biometric data's orientation relative to the sensor is known, whether the biometric reading is high/low quality, etc.). It is impossible to map such a strategy to normal fuzzy extractor technology, because the biometric data may only be enrolled once. However, once again, with our reusable fuzzy extractor, it is trivial to construct multiple public keys derived from data from different sensors, different feature extraction/alignment strategies, and/or different feature representations.

There is still a limitation in the reusability. The limitation is that if the underlying biometric data is compromised, the extractor security breaks down. This will always be true of any biometric authentication system. Embodiments of the present invention use liveness detection and other techniques to mitigate this limitation. Another (minor) limitation is that the root key that is extracted must not be used. If the root key is compromised, the biometric data may be stolen by an adversary trivially (i.e., the public key becomes reversible). This is easily resolved, however, by always hashing the root key before use.

FIG. 1 is a schematic representation of an environment 10 in which an embodiment of the invention may be used. The environment 10 includes a subject 11 who desires access to an information system 15, such as a computer, smartphone, or other such electronic device. However, in accordance with standard data security practices, the information system 15 is protected by a security mechanism that permits access only once the subject has been authenticated as an individual authorized to use the information system 15. Alternatively, the subject 11 is not necessarily desiring access, but the embodiment is being used for surveillance, search, or track applications. Other possible uses are discussed below; it should be appreciated that various embodiments of the invention may be used to perform authentication of subjects as individuals generally, and the choice of embodiments discussed herein is made for concreteness, not to limit the scope of the invention.

Figure 2:
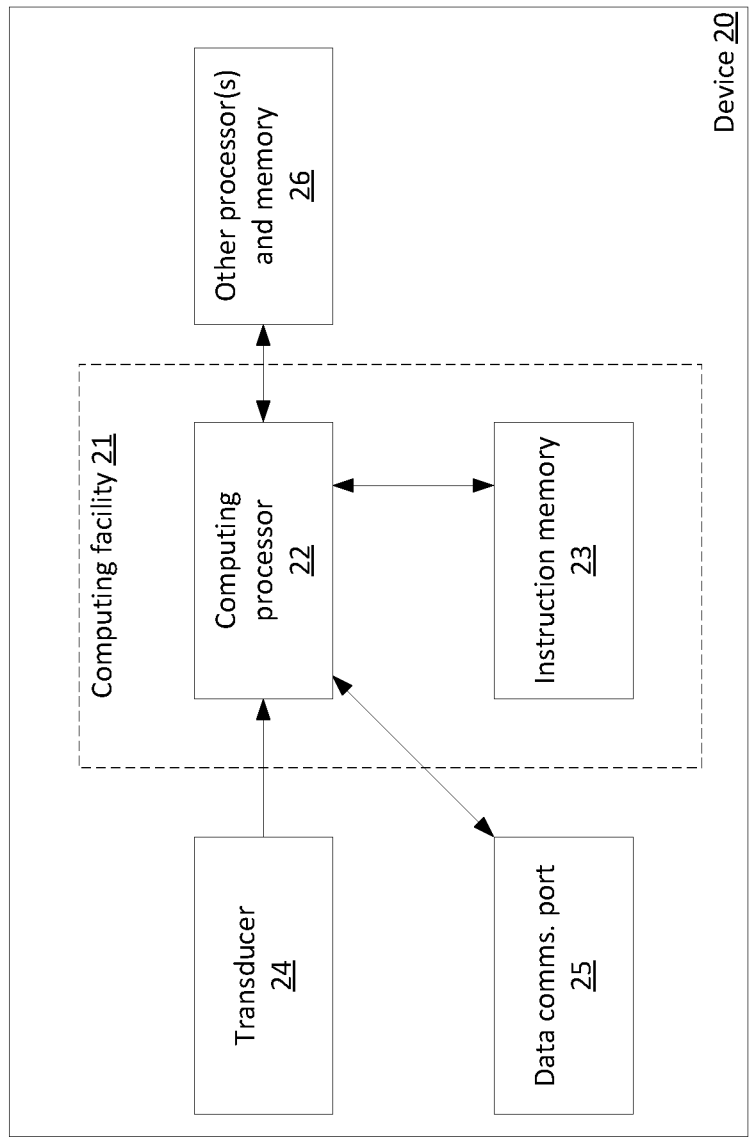
FIG. 2 is a schematic representation of a device 20 for generating or using a biometric public key in accordance with an embodiment of the invention.

To facilitate the authentication process, the subject 11 is presented to a transducer 12, which obtains a biometric. The transducer 12 may be, for example, an iris scanner or a fingerprint reader. The transducer 12 converts raw biometric data, such as an image, into a digital electronic signal that characterizes the biometric of the subject. The digital electronic signal is communicated to a computing facility 13 that performs the computations required to authenticate the subject 11. To perform this task, the computing facility 13 obtains a biometric public key from a storage facility 14. The computing facility 13 may be implemented using hardware, and firmware or software known in the art. In some embodiments of the invention, the transducer 12 and computing facility 13 are embodied in a single device, such as a smartphone. Details of one such embodiment are shown in FIG. 2. The storage facility 14 may be any source of data, including a key store such as a cryptographic token, cloud data storage, website, a server, or any other such storage device.

As discussed in more detail herein, the computing facility 13 combines the characterization of the biometric present in the digital electronic signal with the biometric public key to compute a secret. For example, the secret may be a password, or other such information; in general, the secret may be any digital data. However, since computation of the secret may involve various mathematical or cryptographic operations, the secret is referred to in what follows as a "secret number" on which those operations may be performed, with the understanding that its conversion to ASCII or Unicode characters (or some other format) does not change its information content.

In one embodiment, the biometric public key contains sufficient information for the computing facility 13 to determine that the secret number was correctly computed. For example, the secret number may be encrypted using a one-way function, such as a cryptographic hash, and the hashed value is communicated with the biometric public key. To authenticate the subject 11, the one-way function is applied to the computed (candidate) secret number to determine whether there is a match. Once the determination has been made, the computing facility 13 transmits to the information system 15 an indication that the subject 11 is authenticated as a known individual.

In another embodiment, the computing facility 13 transmits the secret to the information system 15, which determines whether the subject 11 is authenticated as the known individual. For example, the information system 15 could determine, using processes known in the art, whether the secret corresponds to a password already associated with the known individual, and grant or deny access accordingly.

As described in further detail in connection with the first embodiment of the present invention, summarized in the second labeled column of Table 1 (for generation of the public biometric key) and Table 2 (for authentication using the public biometric key), the secret S in fact need not be shared or transferred from the Enroller computer. Instead of computing a hash of S, the Enroller computer uses an additional random number r, and computes, besides the public biometric key B, the encryption of r under the key S, namely Enc_S(r), which is transmitted to the server along with r and B. These entities are used in authentication in a secure multiparty computing session involving the Authenticator and the server, as further described herein.

FIG. 2 is a schematic representation of a device 20 for generating or using a biometric public key in accordance with an embodiment of the invention. During an authentication process, the device 20, and more particularly the computing facility 21, is configured so that a subject is authenticated as a known individual only after the several processes described herein have been successfully completed.

The device 20 includes a computing facility 21, which has a computing processor 22 and an instruction memory 23. The computing facility 21 may be, for example, a hardware security module as known in the art. The computing processor 22 may be any conventional microprocessor, application-specific integrated circuit (ASIC), field-programmable gate array (FPGA), or other similar device. The instruction memory 23 is operable to store instructions that can be executed by the computing processor 22, and can be a conventional volatile random access memory (RAM) or similar as known in the art, a non-volatile memory such as a read only memory (ROM) or similar as known in the art, or a combination of such technologies.

The device 20 also includes a transducer 24, coupled to the computing facility 21, that is operable to output a digital electronic signal that characterizes a biometric. The transducer 24 may be, for example, an iris scanner or fingerprint imager, or other technology known in the art for obtaining biometric data.

The device 20 further includes an optional data communications port 25, coupled to the computing facility 21. The data communications port 25 may be used during an enrollment process to transmit a biometric public key, computed by the computing facility 21, to another device such as a cryptographic token, or to a public data source such as a public key database. Also, the data communications port 25 may be used during an authentication process to receive a biometric public key from such a cryptographic token or public data source. Therefore, the physical configuration of the data communications port 25 may vary depending on application, but may in any event be a wired data networking port (such as an Ethernet port) or a wireless data networking port (such as a Bluetooth or other near-field communication transceiver).

Finally, the device 20 may include one or more other processors and memory 26. The computing facility 21 may be designed to be incorporated into the electronic circuitry of many devices, including desktop computers, smartphones, tablet computers, and similar electronic devices, that perform functions unrelated to authentication. The other processors and memory 26 are shown to demonstrate how a computing facility 21 may be incorporated into such devices.

In some embodiments of the invention, the data communications port 25 is configurable to be coupled to a public data source that contains the biometric public key. Such embodiments may also include a hardware security module for authenticating the public data source to the device according to known methods. Alternately, the data communications port may physically receive a cryptographic token for storing the biometric public key. Note that this alternate embodiment does not require a reliable or consistent connection between the embodiment and any public data source, because the cryptographic token may be authenticated using known methods.

In some alternate embodiments of the invention, the device includes a hardware security module for ensuring the integrity of the second transducer. Such hardware security modules are known in the art. Alternately, the device may include a mathematics coprocessor for accelerating computation of mathematical operations relating to the equation. Such processors are also known in the art.

FIG. 3 is a schematic representation of data flow through functional components used in an embodiment of the invention during an enrollment process. The enrollment process creates a biometric public key for later use to authenticate the individual, as described below in connection with FIG. 4. The enrollment process begins with individual 31. This individual 31 is associated with certain identity information 32, for example a name, address, telephone number, driver license number, or other information that uniquely identifies the individual 31. The individual 31 also possesses measurable biometric information 33, for example a fingerprint or an iris pattern.

The individual 31 presents his or her identity information 32 and biometric information 33 to an enrollment system 34, which may be a device as shown in FIG. 2. In particular, the enrollment system 34 includes a transducer 35 as described above. The transducer 35 measures the biometric information 33 of the individual 31 using techniques known in the art that are particular to the type of biometric. For example, if the biometric is an iris print, then the transducer 35 may take an image of an eye of the individual 31. The transducer 35 then generates a digital electronic signal that characterizes the measured biometric of the individual, and forwards it to a computing facility within the enrollment system 34.

In the enrollment process of FIG. 3, the computing facility performs the indicated function of key generation 36. The key generation process 36 generates a biometric public key 37, as described herein. To aid in later authentication, the enrollment system 34 may transmit the identity information 32 and the biometric public key 37 to a biometric certificate authority 38. The biometric certificate authority 38 may be, for example, a "certificate authority" as that phrase is known in the art of public key infrastructure, or it may be another facility that performs a similar function. The biometric certificate authority 38, upon receiving the identity information 32 and the biometric public key 37, stores these data in a public key database 39, which may be a conventional database.

Additional processes may be added to those depicted in FIG. 3 prior to enrollment. For example, the biometric certificate authority 38 may wish to authenticate the enrollment system 34 prior to accepting a new public key 37 or identity information 32. This may be done through standard encryption and authentication algorithms.

Advantageously, an existing database that (insecurely) stores identity information 32 in conjunction with biometric information 33 may be easily converted to a public key database 39 in accordance with an embodiment of the invention. The conversion process simply entails feeding the identity information 32 and biometric information 33 of each individual directly into the key generation 36 function of the enrollment system 34, bypassing the transducer 35. The resulting biometric public keys 37 may then be stored in association with the identity information 32, and the biometric information 33 may then be deleted (and therefore protected against compromise). Then, the biometric certificate authority 38 will not need to further protect the public key database 39 from malicious access, as no biometric information 33 will be stored therein. Moreover, individuals who had already enrolled will not need to re-enroll.

Moreover, such a conversion would not negatively impact biometric searching, such as might be used for criminal justice purposes. Current systems, including those in use by the Federal Bureau of Investigation, store large quantities of searchable biometric data. Understandably, these data are prime targets for identity thieves and other malicious individuals who would abuse them for profit. However, the above processes may be applied to encode biometric data as a public key that is itself unusable as a biometric, without storing the biometric data in an otherwise usable form. Because the contemplated processes for creating biometric public keys are linear, as described below in connection with FIG. 5, they permit rapid searching to find a match to a biometric query, without the need to decode the stored data. Thus, the vulnerable biometric database can be entirely eliminated.

Figure 4:
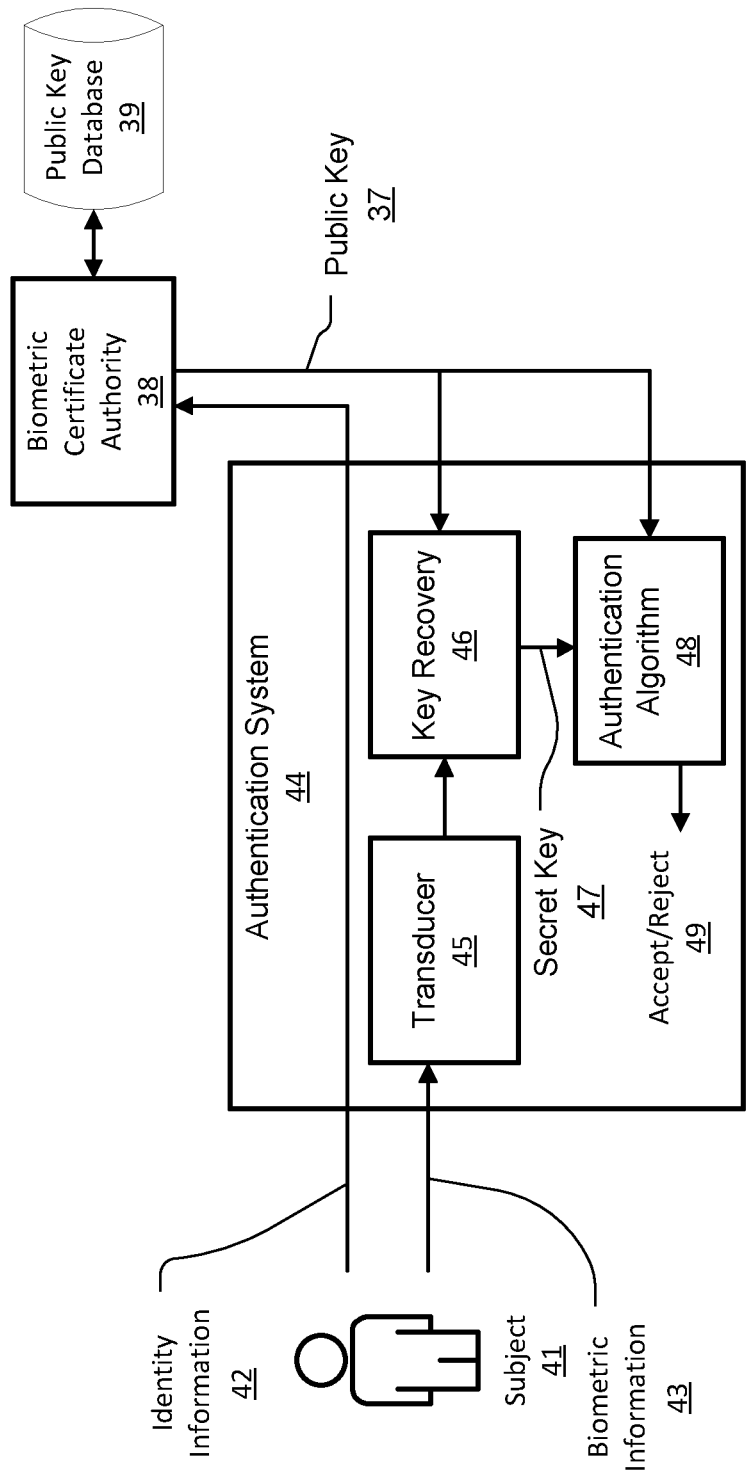
FIG. 4 is a schematic representation of data flow through functional components used in an embodiment of the invention during an authentication process. Prior to authentication, an authorized individual would perform an enrollment process, such as that depicted in FIG. 3.

FIG. 4 is a schematic representation of data flow through functional components used in an embodiment of the invention during an authentication process. Prior to authentication, an authorized individual would perform an enrollment process, such as that depicted in FIG. 3.

The authentication process begins with a subject 41 who is purporting to be the individual 31. Of course, the purpose of the authentication process is to confirm whether or not such a claim of identity is true. Thus, the subject 41 presents his or her identity information 42 and biometric information 43 to an authentication system 44, which may be a device as shown in FIG. 2. In particular, the authentication system 44 includes a transducer 45 as described above. The transducer 45 measures the biometric information 43 of the subject 41 using techniques known in the art that are particular to the type of biometric and forwards a characterization of the biometric to a computing facility, as described above.

The authentication system 44 forwards the identity information 42 to the biometric certificate authority 38 that holds the biometric public key 37 for the purported individual 31. The biometric certificate authority 38 then retrieves the biometric public key 37 from the public key database 39 using the purported identity information 42 (e.g., via a database query), and returns it to the authentication system 44 as indicated. The authentication system 44 may request the biometric public key 37 at any time, but as there may be a delay in obtaining the biometric public key 37 across a data communications network such as the Internet, the authentication system 44 may request the identity information 42 prior to activating the transducer 45. To alleviate this delay, in some embodiments the authentication system 44 includes a port to physically receive a cryptographic token or a dongle on which the biometric public key 37 is stored. In some alternate embodiments, the public key database 39 is stored locally to the authentication system 44 (e.g., accessible via a private network). In these embodiments, it may be efficient or more user-friendly to compare the biometric information 43 against every biometric public key 37 in the public key database 39. In this way, the subject 41 need not provide any identity information 42 at all.

Upon receipt of both the biometric information 43 of the subject 41, and the biometric public key 37 of the individual, the computing facility then performs authentication as described herein in connection with embodiments discussed with reference to Table 2.

Figure 5:
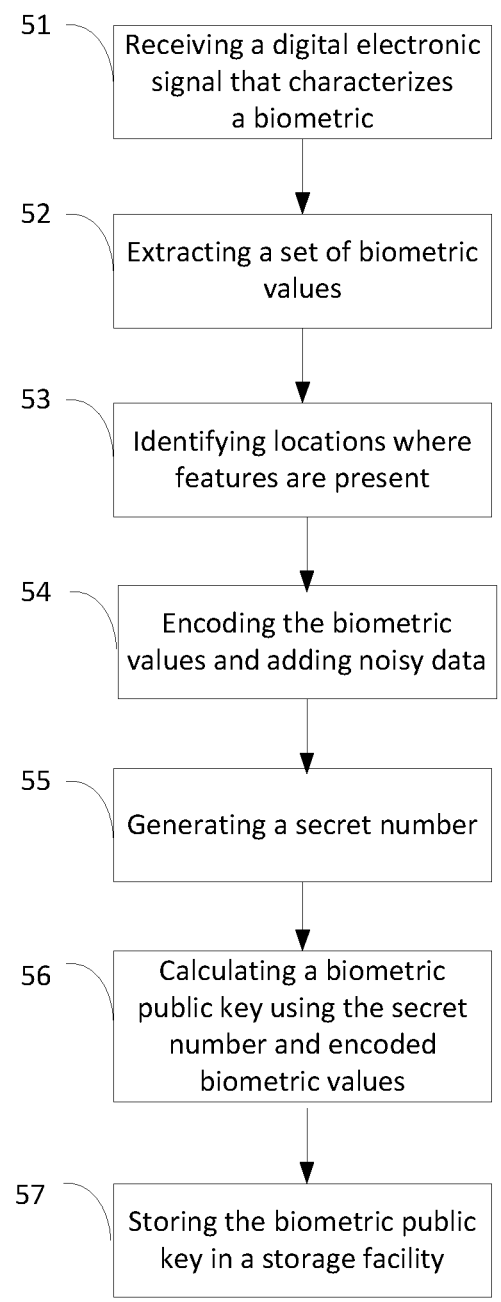
FIG. 5 is a flowchart illustrating a method of generating a biometric public key for an individual based on biometric data of the individual, without the need for non-transient storage of the biometric data, in accordance with the enrollment process of FIG. 3.

FIG. 5 is a flowchart illustrating a method of generating a biometric public key for an individual based on biometric data of the individual, without the need for non-transient storage of the biometric data. For concreteness, the biometric is described as an iris print; a person having ordinary skill in the art should be able to appreciate how the subsequent processes differ for other biometrics.

The processes of FIG. 5 are contemplated to be carried out by a computing facility in an enrollment system, such as the enrollment system 34 shown in FIG. 3. In a preferred embodiment, the computing facility is located in a secure environment, where the individual's identity could be separately authenticated. Thus, for example, the computing facility may be at a police station, or in a security office of a company, where a trusted person can verify the identity of the individual.

In a first process 51, the computing facility receives, from a transducer, a digital electronic signal that characterizes a biometric of the individual 31, as described above. Transduction may be performed according to any method known in the art. For an iris print, the transducer takes a photograph or video image of an iris, and outputs a signal encoding the image as (e.g. pixel) data according to a standard data format (e.g. RGB or grayscale).

In a second process 52, the computing facility extracts a set of biometric values from the signal. A biometric value may be any digital data, but is typically a single bit representing a "most important" feature of the corresponding binary-encoded number, where importance depends on the particular application. In embodiments, the biometric values have a Sparse Representation, which is encoded in a manner making it challenging to identify which locations of the vector are actually encoding features. The biometric values have so much data, that, even if the data were stolen, the data would not be particularly revealing of the biometric itself, because the data also contains so much noise C.

In a third process 53, the computing facility identifies, in the set of biometric values, locations where features are present. For example, if the signal includes pixel data, the biometric values may have locations of varying brightness intensity or a mixture of color values. Locations in the biometric value may be identified based on a feature (e.g., brightness above or below a pre-determined threshold) being present at those locations. In a fourth process 54, the computing facility encodes the set of biometric values as a column vector E by choosing a marker (e.g., "0") at locations where features are present and, where features are not present, choosing noisy data, such as chaff bit values. Optionally, the chaff bit values are selected collectively from a group of (a) random values and (b) independent and identically distributed values. The computing facility encodes the biometric data in such manner so as to include noise in the encoding, such that it is challenging to identify which locations are actually encoded features.

In a fifth process 55, the computing facility generates a secret number. There are many methods for generating a secret number, including the use of a pseudo-random number generator. The computing facility may encrypt the secret number S using a one-way function (say, F). It should be appreciated that, because the function F is one-way only, the secret number S cannot be feasibly recovered from the hashed value F(S), so the latter value F(S) may be made public without compromising the secret number S. Alternately, the secret number may be provided by the individual, in the form of a pass phrase that is subsequently processed using a cryptographic (e.g. hash) function.

In a sixth process 56, the computing facility calculates a biometric public key based on the secret number and the encoded biometric values. The process 56 corresponds to the function of key generation 36 in FIG. 3. One method of computing such a biometric public key uses linear algebra, although a person of ordinary skill in the art may appreciate other methods that may be used.

The linear algebra method may be more easily understood if some notation is first set. Represent the biometric public key as a vector of bits called B, the secret number as a vector of bits called S, and the encoded biometric values as a vector of N bits called E. The biometric public key B has the same size as the encoded biometric values E (i.e., each can be expressed as a column vector having N bits), while the secret number S may have any size (i.e., it can be expressed as a secret column vector of N bits). Choose a binary matrix A that has N rows and M columns of bits. Then a formula for the biometric public key B may be expressed as $B = A \cdot S + E$. That is, the biometric public key B is obtained by multiplying the binary matrix A by the secret number S (i.e., using matrix multiplication), then adding the encoded biometric values E (i.e. using a bitwise exclusive OR). The binary matrix A will not be square if $M \neq N$.

The binary matrix A may be chosen using any technique, or may be chosen at random. One embodiment may choose the binary matrix A for each biometric public key B, so that it is uniquely associated with the individual. In this embodiment, the binary matrix A must be distributed with each biometric public key B, and in essence forms part of the public key. Another embodiment may associate the binary matrix A with the computing facility itself, to identify keys generated using that facility. In this embodiment, the binary matrix A is not uniquely associated with each biometric public key B, but must be obtained from a biometric certificate authority or other source prior to authentication. Still another embodiment may designate the binary matrix A as a constant design parameter, so that multiple computing facilities may be used to generate cross-compatible biometric public keys. In this embodiment, the binary matrix A need not even be made public, and may be stored in a secure portion of the device that generates the biometric public key B.

One may appreciate that the formula for B is linear. Therefore, in accordance with known properties of such formulas, it may be solved for a candidate value for the secret S, so long as B, A, and E are known. In particular, the solution is given by $S = A^{-1}(B-E)$, where if the binary matrix A is not square, a generalized matrix inverse (such as the Moore-Penrose pseudoinverse) may be used for the matrix multiplication. However, despite this linearity, the use of the secret S operates to mask the encoded biometric values E from detection, encrypting the value of E. In a pleasing symmetry, the use of the encoded biometric values E operates to encrypt the value of S. In this way, the value of B verifiably characterizes both the biometric data of the individual and the secret number, without the need for non-transient storage of either the biometric data or the secret number.

It should be appreciated that the calculation may include information other than just the secret number S and the encoded biometric values B. Other information traditionally used for authentication purposes may be included as well, such as a name, driver license number, street address, organization membership number, and so on. This additional information may be easily incorporated in the linear method by first converting it to a compatible binary form, then (bitwise) adding it into the biometric public key B directly, or (bitwise) adding it to the secret number S before multiplication with the binary matrix A. It will also be appreciated that, if such additional information is used in calculating the biometric public key B, it must also be presented during authentication; in this case, the formula to solve for the secret number S must be modified accordingly.

The method of FIG. 5 concludes with a seventh process 57, in which the computing facility stores the biometric public key in a storage facility. In embodiments, the computing facility stores the secret number S (or hash F(S) of the secret number S) and/or the binary matrix A. The storage facility may be a memory outside the computing facility, such as the non-authentication memory of an enrollment system 34. The enrollment system 34 may then perform optional operations using this biometric public key that are not strictly related to key generation, such as displaying a message on a display screen. Alternately, the storage facility may be a memory within the computing facility itself, if the device housing the computing facility is intended to be used only by the individual or a small group of authorized individuals. In another embodiment, the storage facility is a cryptographic token or a dongle provided by the individual, which stores the biometric public key for later authentication use by the individual.

Figure 6:
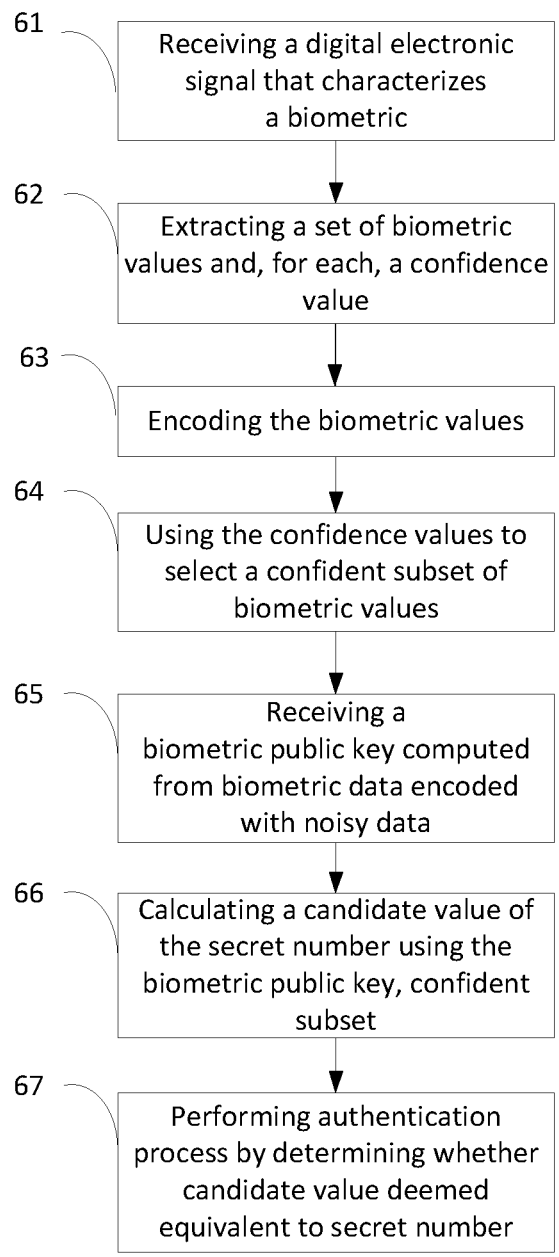
FIG. 6 is a flowchart illustrating a method of using biometric data to authenticate a subject as an individual whose biometric data has been previously obtained using a first transducer, without the need for non-transient storage of the biometric data, in accordance with the authentication process of FIG. 4.

FIG. 6 is a flowchart illustrating a method of using biometric data to authenticate a subject as an individual whose biometric data has been previously obtained using a first transducer, without the need for non-transient storage of the biometric data. The processes of FIG. 6 are contemplated to be carried out by a computing facility in an authentication system, such as the authentication system 44 shown in FIG. 4.

In a first process 61, the computing facility receives, from a transducer, a digital electronic signal that characterizes a biometric of the subject 41, as described above. Transduction may be performed according to any method known in the art. For an iris print, the transducer takes a photograph or video image of an iris, and outputs a signal encoding the image as (e.g. pixel) data according to a standard data format (e.g. RGB or grayscale).

In a second process 62, the computing facility extracts a set of biometric values from the signal. Also in the second process 62, the computing facility extracts, for each such biometric value, a confidence value indicating a degree of confidence that the corresponding biometric value is stable between characterizations. A confidence value may also be any digital data, but is typically a number of bits representing how far the biometric value is from the pre-determined threshold. That is, if the original measurement is close to the threshold, then categorization of the corresponding measurement as a biometric value is less certain, while if the original measurement is farther away from the threshold, then categorization is more confident. Thus, for example, certain pixels in an iris image may not be read consistently across several readings, while others will. This information will change with each iris, but is generally consistent for each iris.

In a third process 63, the computing facility encodes the biometric values of the subject as a column vector E'. In embodiments, the computing facility encodes the biometric values as a column vector E' having N bits including noisy data. In various embodiments, the noisy data are chaff bit values. The vector is encoded to have a marker (e.g., "0") at locations where features are present and, where features are not present, to have noisy data. In one embodiment, the noisy data are implemented as chaff bit values that have been selected collectively from a group of (a) random values and (b) independent and identically distributed values.

In a fourth process 64, the computing facility uses the confidence values to select a confident subset of encoded biometric values that are stable between characterizations. The confident subset is selected from encoded biometric values in the set of biometric values of the subject that are not noisy data. The confident subset should be a reliable discriminant of the identity of the subject based on the biometric, and may be done, for example, by selecting a subset of the encoded biometric values whose corresponding confidence values are above a certain threshold. However, the selected confident subset only selected from the biometric values that are not encoded as noisy data. This process 64 selects biometric values that are less likely to be noisy, and more likely to be stable. Thus, although each individual iris capture may have significant variation, each will very likely contain a subset of pixels that are reliable, and can be used in subsequent processing. The processes 62-64 optionally may be repeated during enrollment until the confident subset of such pixels stabilizes.

Processes 62-64 together produce a confident subset of the raw biological values that can be used to reliably discriminate between individuals. Ideally, the confident subset permits identification of individuals with an extremely low false acceptance rate (where a subject is authenticated as an individual that they are not), and with a relatively low false rejection rate (where a subject is not authenticated as an individual that they are).

In a fifth process 65, the computing facility receives, by the computing facility, from a storage facility, a biometric public key B that was computed based on the secret number S and the biometric data of the individual that has been previously obtained. The biometric data of the individual is a vector E encoded to have the marker at locations where features are present and, where features are not present, to have noisy data. In one embodiment, the noisy data are implemented as chaff bit values that have been selected collectively from a group of (a) random values and (b) independent and identically distributed values. The computing facility also receives the secret number S or a hash F(S) of the secret number S and may receive the matrix A described in process 56 of FIG. 5.

In a sixth process 66, the computing facility calculates a candidate value for the secret number using the biometric public key and the confident subset. In embodiments, the calculation of the candidate value also uses the matrix A described in process 56 of FIG. 5. The candidate value for the secret number S' may be computed by (a) multiplying the inverse of the matrix A with (b) the difference between the biometric public key and the confident subset of column vector E' of the encoded set of biometric values of the subject.

The method of FIG. 6 concludes with a seventh process 67, in which the computing facility performs an authentication process that indicates when the subject is authenticated as the individual by determining whether the candidate value for the secret number is deemed equivalent to the secret number characterized by the biometric public key. As described above in connection with FIG. 1, to determine equivalence, the secret number S may be encrypted using a one-way function (say, F) and the hashed value F(S) is received with the biometric public key B in process 65. It should be appreciated that, because the function F is one-way only, the secret number S cannot be feasibly recovered from the hashed value F(S), so the latter value F(S) may be made public without compromising the secret number S. To authenticate the subject, the function F is applied to the candidate value for the secret number S' to determine whether there is a match; that is, whether F(S)=F(S'). If so, then using well-known properties of cryptographic hash functions, one may conclude with a high degree of confidence that S=S', so the computing facility in fact already possesses the secret number S.

TABLE 1

Public Biometric Key Generation

| | Original Process | Reusable Process Using Root, r, for Secret S | Reusable Process Using Noise, C, with Confident Subset |
|---|---|---|---|
| 1 | (Enroller) Obtain transiently stored biometric with a Dense Representation | (Enroller) Obtain transiently stored biometric with a "Dense Representation" | (Enroller) Obtain transiently stored biometric with a "Sparse Representation" |
| 2 | (Enroller) Encode the biometric data directly as E, a column vector of M bits | (Enroller) Encode the biometric data directly as E, a column vector of M bits | (Enroller) Encode the biometric data as E by choosing a marker at locations where features are detected and, where features are not detected, choosing noisy data. E is a column vector of M bits. |
| 3 | (Enroller) Generate secret column vector S having N bits and compute hash F(S) | (Enroller) Generate random number r, and random secret column vector S having N bits | (Enroller) Generate secret column vector S having N bits and compute hash F(S) |
| 4 | (Enroller) Choose matrix A having M rows and N columns of bits | (Enroller) Choose matrix A having M rows and N columns of bits | (Enroller) Choose matrix A having M rows and N columns of bits |
| 5 | (Enroller) Calculate public biometric key | (Enroller) Calculate public biometric key | (Enroller)Calculate public biometric key |

TABLE 1-continued

Public Biometric Key Generation

| | Original Process | Reusable Process Using Root, r, for Secret S | Reusable Process Using Noise, C, with Confident Subset |
|---|---|---|---|
| 6 | $B = A \cdot S + E$ (Enroller) Publish or send $F(S)$, A, B. | $B = A \cdot S + E$ (Enroller) Send, to Server, A, B, r, and $Enc\_S(r)$ (standing for -encryption of r under the key S-) | $B = A \cdot S + E$ (Enroller) Publish or send $F(S)$, A, B. |
| 7 | N/A | (Server) Receive and register A, B, r, $Enc\_S$ (r). Generate random secret column vector S' having N bits. Compute $B' = B + A \cdot S'$ (Note: $B' = A \cdot (S + S') + E$) | N/A |

TABLE 2

Authentication using Public Biometric Key

| | Original Process | Reusable Process Using Root, r, for Secret S | Reusable Process Using Noise, C, with Confident Subset |
|---|---|---|---|
| 1 | (Authenticator) Obtain transiently stored biometric | (Authenticator) Obtain transiently stored biometric | (Authenticator) Obtain transiently stored biometric |
| 2 | (Authenticator) Receive $F(S)$, A, B | (Authenticator) Receive A, B, r, $Enc\_S$ (r). | (Authenticator) Receive $F(S)$, A, B |
| 3 | (Authenticator) Encode the biometric data directly as E', a column vector of M bits. Select N confident rows of E'. | (Authenticator) Encode the biometric data directly as E', a column vector of M bits. Select N confident rows of E'. | (Authenticator) Encode the biometric data directly as E', a column vector of M bits. Select N confident rows of E'. |
| 4 | (Authenticator) Use confident rows and E' to compute $S' = A^{-1} \cdot (B - E')$ (Note: Successful if $S' = S$) | (Authenticator) Use confident rows and E' to compute $S'' = A^{-1} \cdot (B - E')$ (Note: Successful if $S'' = S + S'$) | (Authenticator) Use confident rows and E' to compute $S' = A^{-1} \cdot (B - E')$ (Note: Successful if $S' = S$) |
| 5 | (Authenticator) Compute hash $F(S')$ | Authenticator has S'' and Server has S', r, and $Enc\_S(r)$. Authenticator and Server work securely together to compute $r' = Dec\_X(Enc\_S(r))$, where $X = S'' - S'$ and $Dec\_X(y)$ is the decryption of y under the key X (Both server and Authenticator) Receive r' | (Authenticator) Compute hash $F(S')$ |
| 6 | (Server) Authenticate by determining if hashes are equal: $F(S') = F(S)$ | (Server) Authenticate by checking if $r' = r$, in which case the authentication is successful | (Server) Authenticate by determining if hashes are equal: $F(S') = F(S)$ |

Owing to the nature of matrices, it will be appreciated that the initial decision to represent a vector as a column or a row is arbitrary, and the terms "row" and "column" in the discussions above and in the claims below can be systematically interchanged without loss of meaning. Accordingly, each claim having any limitation that recites a set of matrices is intended also to include a corresponding claim wherein each of the recited matrices is transposed.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A device for generating a biometric public key for an individual based on biometric data of the individual, without the need for non-transient storage of the biometric data, the device comprising:
    a transducer; and
    a computing facility, coupled to the transducer, the computing facility including a computing processor and a non-transitory computer readable storage medium encoded with instructions that, when executed by the computing processor, establish computer processes comprising:
        receiving by the computing facility, from the transducer, a digital electronic signal that characterizes a biometric of the individual;
        extracting by the computing facility, from the digital electronic signal, a set of biometric values of the individual;
        identifying, in the set of biometric values, locations where features are present;
        encoding the set of biometric values by choosing a marker at locations where features are present and, where features are not present, choosing noisy data;
        generating by the computing facility a secret number S;
        computing by the computing facility the biometric public key B based on the secret number and the encoded set of biometric values, wherein the biometric public key verifiably characterizes both the biometric data of the individual and the secret number without the need for non-transient storage of either the biometric data of the individual or the secret number; and
        storing the biometric public key in a storage facility.

2. A device according to claim 1, wherein the set of biometric values of the individual has a Sparse Representation.

3. A device according to claim 1, wherein the encoded set of biometric values is a column vector E having N bits.

4. A device according to claim 1, wherein the secret number S is a secret column vector of N bits.

5. A device according to claim 1, wherein generating the secret number S includes computing and storing a hash F(S) of the secret number S in the storage facility.

6. A device according to claim 1, wherein the biometric public key B is computed using a matrix A having M rows and N columns of bits, and matrix A is stored in the storage facility.

7. A device according to claim 6, wherein the biometric public key B is computed by multiplying the secret number S and the matrix A, and adding a column vector E of the encoded set of biometric values.

8. A device according to claim 1, wherein the marker is a constant value.

9. A device according to claim 8, wherein the marker is "0".

10. A device according to claim 1, wherein the noisy data is a set of chaff bit values selected collectively from a group of (a) random values and (b) independent and identically distributed values.

11. A device for using biometric data to authenticate a subject as an individual whose biometric data has been previously obtained using a first transducer, without the need for non-transient storage of the biometric data, the device comprising:
    a second transducer; and
    a computing facility that is coupled to the second transducer, the computing facility including a computing processor and a non-transitory computer readable storage medium encoded with instructions that, when executed by the computing processor, establish computer processes comprising:
        receiving by the computing facility, from the second transducer, a digital electronic signal that characterizes a biometric of the subject;
        extracting by the computing facility, from the digital electronic signal, (a) a set of biometric values of the subject and (b), for each member of the set of biometric values of the subject, a confidence value indicating a degree of confidence that the corresponding biometric value is stable between characterizations;

encoding the set of biometric values of the subject;

using the confidence values to select, by the computing facility, a confident subset of the encoded set of biometric values of the subject, the confident subset being a reliable discriminant of the identity of the subject based on the biometric;

receiving, by the computing facility, from a storage facility, (i) a hash F(S) of a secret number S and (ii) a biometric public key B that was computed based on the secret number S and the biometric data of the individual that has been previously obtained using the first transducer, wherein the biometric data of the individual had been encoded to have a marker at locations where features are present and, where features are not present, to have noisy data;

computing, by the computing facility, a candidate value S' for the secret number S using the biometric public key and the confident subset; and performing an authentication process by determining whether the candidate value S' is deemed equivalent to the secret number S.

12. A device according to claim 11, wherein the biometric data of the individual has a Sparse Representation.

13. A device according to claim 11, wherein the encoded set of biometric values of the subject is a column vector E' having M bits.

14. A device according to claim 11, wherein the encoded biometric data of the individual is a column vector E having N bits.

15. A device according to claim 11, wherein (a) the secret number S is a first secret column vector of N bits and (b) the candidate value for the secret number S' is a second column vector of N bits.

16. A device according to claim 11, wherein the computer processes further comprise:

receiving, by the computing facility, from the storage facility, a matrix A having M rows and N columns of bits, wherein the biometric public key B was computed based on the matrix A.

17. A device according to claim 16, wherein the candidate value for the secret number S' is computed by (a) multiplying the inverse of the matrix A with (b) the difference between the biometric public key and the confident subset of column vector E' of the encoded set of biometric values of the subject.

18. A device according to claim 11, wherein the computer processes further comprise:

computing a hash F(S') of the candidate value for the secret number S'; and performing the authentication process by determining whether (a) the hash F(S') of the candidate value for the secret number S' is deemed equivalent to (b) the hash F(S) of the secret number S.

19. A device according to claim 11, wherein the set of biometric values of the subject is encoded to have the marker at locations where features are present and, where features are not present, to have noisy data.

20. A device according to claim 11, wherein the marker is a constant value.

21. A device according to claim 20, wherein the marker is "0".

22. A device according to claim 11, wherein the noisy data is a set of chaff bit values selected collectively from a group of (a) random values and (b) independent and identically distributed values.

* * * * *